Patented June 24, 1952

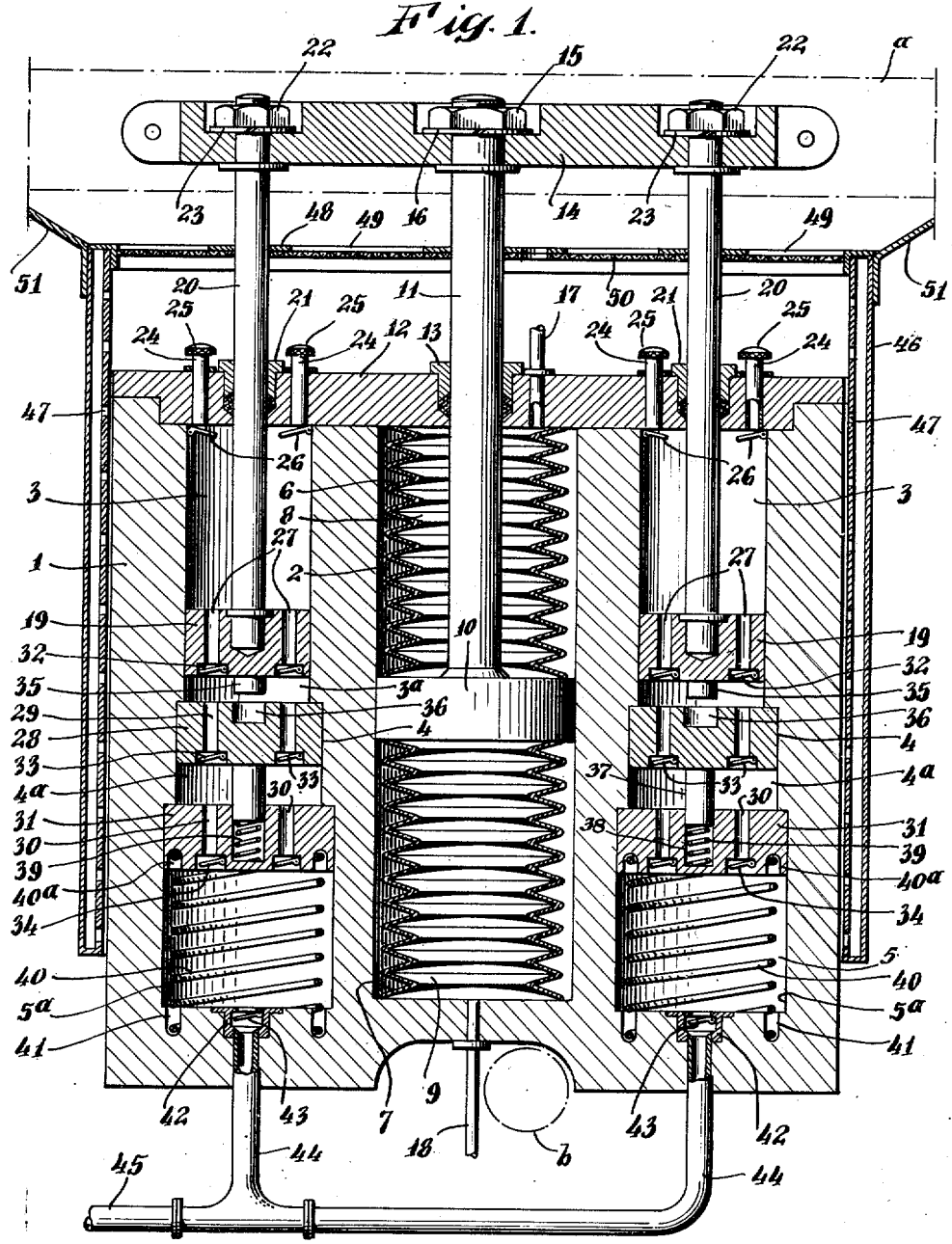

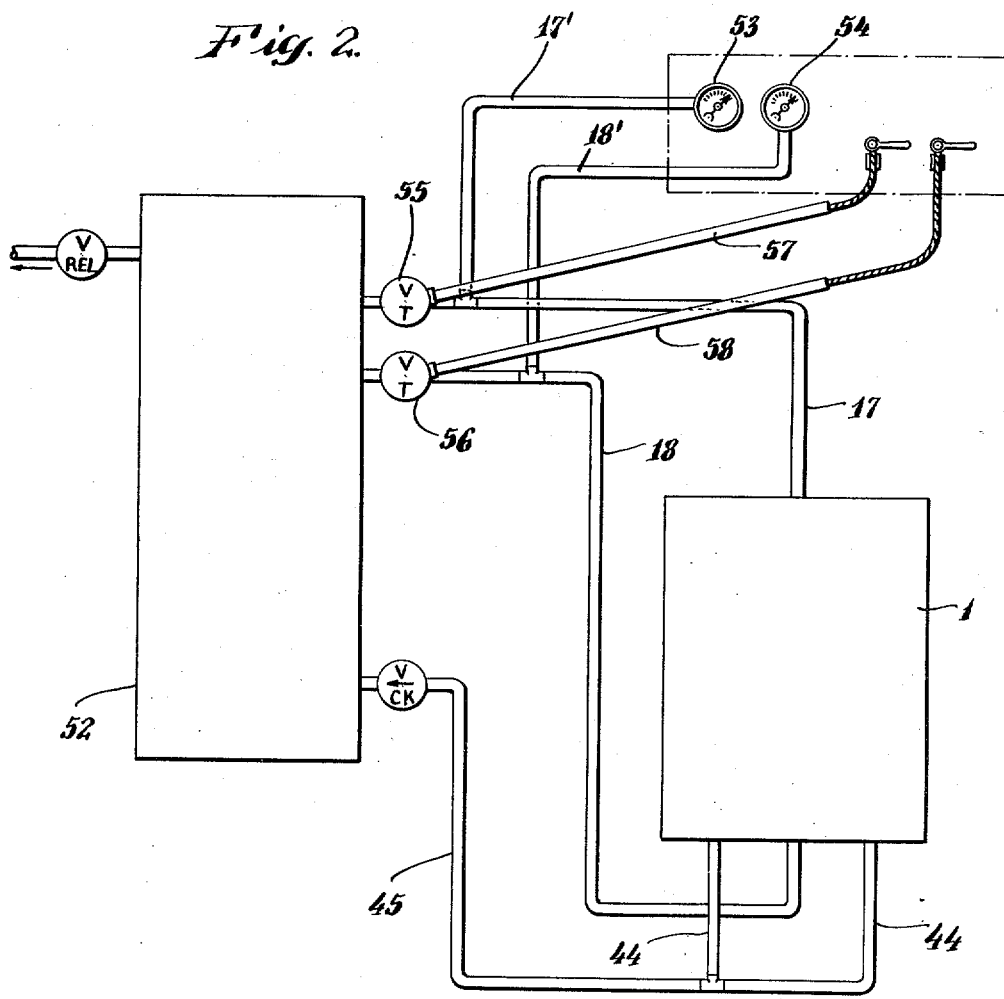

2,601,551

UNITED STATES PATENT OFFICE 2,601,551

SUSPENSION SYSTEM FOR VEHICLES

Miguel Navarro, Enrique Joaquin Llovet, and Aurelio Eduardo Llovet, Montevideo, Uruguay Application November 21, 1947, Serial No. 787,300
In Argentina October 16, 1947

6 Claims. (Cl. 267—65)

The present invention is concerned with an oscillating suspension system for vehicles, i. e. a system adapted for mounting the vehicle frame upon the wheels which form the rolling support, the freely oscillating suspension between both portions of the vehicle being achieved by the mechanical combination of the elements forming a system which serves to solve the many problems created in the arrangement of an oscillating coupling device sensitive to the uneven parts of roads and highways, and which is capable of yielding to the least differences in level, compensating the effects of same and causing a normal running condition, without the troubles inherent to violent jolts of the vehicle body, of permitting the smooth running of the vehicles due to a total neutralization of the differences in level which is brought about by said system, thus permitting of a balanced run of the vehicle. Another problem solved by the invention, is the damping effect of the shocks caused by differences in level. This damping effect results from the functional relationship between the members which form the system of the invention, i. e. the assembly of an apparatus the movable parts whereof are suitably balanced so as to avoid the violent oscillating movements, while said parts are protected and the assembly kept in best running condition. Finally said system has in view an essentially novel factor, namely the storage within a container suitably located at an adequate place of the vehicle body, of compressed air capable of being automatically renewed as the air is being spent. This arrangement brings about the important result that the driver of the vehicle is thus in a condition of supplying at will and without having to resort to service stations, the compressed air required for inflation of pneumatic tubes of the vehicle tires, and thus provides for a very important advantage, particularly if the vehicles concerned are used to travel through long distances, as is the case, for instance, with cargo trucks traveling between distant places or vehicles for individual or collective transportation on touring trips.

For the reasons stated above it may be gathered that the system in question provides a technical solution tending towards a maximum degree of simplification in the resilient mounting of the vehicle frame to the rolling supports, inasmuch as said system forms an efficient substitution for the usual semi-elliptic suspension springs as well as the hydraulic shock absorbing devices used to protect the usual springs against the violent jolts and prevent damage to said springs due to the breaking of one or more leaves thereof, as frequently happens with vehicles used for long journeys.

The system in question is structurally characterized by a casting having a plurality of longitudinal recesses, or bores forming cylinders, namely, a central one subdivided into two co-axial chambers formed by resilient bellows-shaped casings, a piston being interposed between said casings. The piston rod extends outwardly of the upper coaxial chamber, and is secured to a supporting member secured in turn to the vehicle frame. Both chambers constitute the oscillating suspension means between the vehicle frame and the wheels and, at the same time, due to the balanced relationship between both chambers, act as a damping means for the oscillating movement and thus keep the vehicle in regular and uniform running conditions. The other cylinders formed in the casting constitute each one a pumping chamber subdivided into sections or steps of downwardly increasing diameter, the diameter of the lowermost step thus being the largest. The subdivision is determined by pistons provided in sliding arrangement in each of said steps, said pistons being engaged with one another in a mutually slidable manner. The pistons forming the means for supplying compressed air to a storage container mounted at a suitable place of the vehicle body, the connection between the steps being established by means of passages through the pistons controlled by check valves the opening motion whereof is subordinated to the sucking stroke of the pistons.

The system is complemented by means for connecting the lowermost steps of the casting with the compressed air storage container, further by means for connecting the uppermost step with the atmospheric air through the intervention of filtering members adapted to prevent the entrance of foreign matter into said cylinders, and further by connecting means between the co-axial chambers formed in the central portion of the casting, with the storage container, and by protecting means for the casting preventing the accumulation of foreign matter which might hamper the free action of the apparatus of the system which forms the subject-matter of the present invention.

In order that the present invention may be fully understood and easily carried into practice, the same has been disclosed in the appended drawings showing a practical embodiment of the apparatus forming part of the system considered, and wherein:

Fig. 1 is a vertical sectional view of a suspension, shock absorbing and air compressing assembly for motor vehicles and the like which embodies the present invention; and Fig. 2 is a schematic illustration of a suitable compressed air storage system for use in association with the assembly of Fig. 1.

As disclosed in Fig. 1 of the drawing, the apparatus comprises the following arrangements of parts: a casting 1 in block shape, having a central recess 2 and two lateral recesses, each of the latter being subdivided each into three sections, one upper intake section 3, one intermediate section 4, and one lowermost section 5 of a larger diameter than the intermediate section which is, as shown, of a larger diameter than the upper section.

Within the central recess 2 two resilient casings of bellows-shape 6 and 7 are housed, forming a pair of co-axial chambers, namely, an upper one 8 and a lower one 9. Between both casings 6 and 7, a piston 10 is provided which is secured to a rod 11 extending outwardly of the block 1 through a cover 12, and guided in a stuffing-box 13. Said rod is secured at its upper end to a supporting member 14, by means of a lock nut 15, and an expanding washer 16 is interposed between the nut 15 and the member 14 to prevent inadvertent loosening of the assembly.

Both chambers 8 and 9 are connected with a compressed air storage tank, 52 (Fig. 2), installed at a suitable location in the vehicle body, by means of pipe conduits 17 and 18. Said pipe conduits are provided with branches 17' and 18', respectively, leading to the driver's station and connected to suitable pressure indicating devices, for example, the manometers 53 and 54 located on the dash-board. In order to control the degree of resistance to circulation of air towards the cambers 8 and 9, and for regulating said resistance by suitably increasing or diminishing the restriction to such circulation of the air, metering valve devices 55 and 56 are interposed in said pipe conduits 17 and 18 and have suitable controls 57 and 58 extending therefrom to the driver's station for hand manipulation by the driver so that the latter may regulate the resistance to circulation of the compressed air in accordance with the load being carried.

Within the lateral intake recesses 3 are housed the pistons 19 secured to their corresponding piston rods 20. Said rods project outwardly of said chambers through the cover 12 being guided in stuffing-boxes 21 secured to said cover, and at their upper ends. Said rods are secured to the supporting member 14 by means of lock nuts 22 with the interposition of expanding washers 23 for keeping said rods and lock nuts in mutual screw adjustment. The supporting member 14 constitutes the means for attaching the apparatus to the vehicle frame, a lateral portion thereof being fragmentarily shown at $a$, whereas the casting block 1 is seated with its base against the axle portion $b$ located between the sides of the frame and the wheel rims having secured thereto the tires, both of them not shown. The coupling means connecting the block and the axle portion $b$ are not illustrated in the drawing but may be of any conventional form.

The intake chambers 3 are connected with the atmosphere by means of intake pipes 24 secured to the cover 12 and provided at their upper ends with straining members 25 to prevent the entrance of foreign matter into the chambers 3. In the lower opening of said pipe members 24 are pivotally secured check valves preferably of the flap type 26.

The pistons 19 are provided with axial passages 27 providing communication between the upper zone of the chambers 3 and the lower zone $3a$ thereof, comprised between the base of said pistons 19 and the piston heads or upper faces of the pistons 28 contained within the intermediate chambers 4. These pistons 28 are in turn provided with axial passages 29 communicating between the zone $3a$ and the lower zone $4a$ of the intermediate chambers 4. These lower zones $4a$ are connected with the lowermost zone $5a$ of the chambers 5, by means of passages 30 through the pistons 31. The passages 27, 29 and 30 are provided at their lower openings with check valves 32, 33 and 34, directed in the same sense said valves being similar to the valves 26 of the pipe members 24 and said valves being apt to be included in both openings of the passages 27, 29 and 30.

As shown in the appended drawing, the pistons 19, 28 and 31 are spaced apart from one another at suitable distances, in order to permit intermediate zones $3a$ and $4a$ to be charged with the necessary air for the purpose of supplying the storage tank with air during the compression strokes.

Since the diameters of the chambers 3, 4 and 5 are different and increase starting from chamber 3, mutual coupling means are provided between the pistons 19, 28 and 31 for preventing the pistons 19 and 28 from lateral oscillation when they pass into the chambers 4 and 5. The coupling means comprise a stem 35 which extends from the base of each of the pistons 19 and is shaped so as to enter into a recess 36 formed in the head of each of the pistons 28. From the base of each of the pistons 28 a stem 37 projects and is extended so as to seat within recesses 38 formed in the upper faces of pistons 31. These recesses carry helical expansion springs 39 tensioning during the suction or return strokes the pistons 28 towards and into the position shown in the drawing. In the zones $5a$ of the chambers 5 are housed helical expansion springs 40 within circumferential recesses $40a$ and 41 formed in the lower faces of the pistons 31 and in the bottoms of the lowermost zone $5a$ of said chambers 5. This arrangement permits of a greater margin of downward displacement of the pistons 31.

In the bottom of the lowermost zone of the chambers 5 are secured bushings 42 having check valves 43 similar to those already described. Said valves control the circulation of air to the pipe conduits 44 connecting the chambers 5 with the storage tank, by mutual connection between said pipe conduits and a further pipe conduit 45 extending towards the storage tank and forming a closed circuit between said chambers and said tank.

The apparatus is completed by the inclusion of a cover or cap 46 formed by a double-walled casing containing lubricant capable of seeping through holes 47 formed in the inner wall of the casing and opening against the walls of the casting 1. Said cap is provided with a cover 48 having guiding holes for the rods 11 and 20 and for the passage of the pipe conduit 17, as well as openings 49 for the intake of atmospheric air through a straining member 50 preventing the passage of foreign matter into contact with the upper portion of the cover 12. Said cap is secured to the frame $a$ by means of holding straps 51, permitting of a perfectly balanced adjustment of the apparatus to the frame.

In operation, the above described device embodying the invention, functions as follows:

The piston rods 11 and 20 being secured at their upper ends relative to the vehicle frame *a* and the housing or casting 1 being supported on the axle *b*, the resilient casings or bellows 6 and 7 disposed in the chambers 8 and 9, respectively, and abutting against the top and bottom of piston 10 on rod 11 will resiliently resist movement of the frame relative to the axle and the lower resilient casing or bellows 7 will serve to support the load of the vehicle distributed to the attachment bracket 14. When the supporting wheels encounter an uneven portion of the road surface to cause movement of the casting 1 relative to the piston rods 11 and 20, such movement is yieldably resisted by the resilient casings or bellows 6 and 7 and by the resistance in conduits 17 and 18 to the flow of compressed air therethrough to and from the chambers 8 and 9. Thus, the displacement of the piston rod 11 relative to the casting 1 is damped out to protect the resilient casings 6 and 7 against the imposition thereon of excessive strains. Further, by varying the resistance to the flow of compressed air through the conduits 17 and 18 in either direction, the damping action of the compressed air may be adjusted in accordance with the load carried by the vehicle.

Simultaneously with the oscillating motions of the rod 11 oscillating motions are incurred, too, by the rods 20, and the pistons 19 thereof, in their upward stroke relative to the casting 1, will compress the air within the chambers 3, which will pass to the zones 3*a* thereof, and in their downward stroke relative to the casting, will compress the air within the zones 3*a*, impelling it through the passages 29 of the pistons 28 towards the lower zone 4*a* of the chambers 4, and thence, impelled by the pistons 28 in their downward stroke, the fluid is impelled through the passages 30 of the pistons 31 towards the lowermost zones 5*a* of the chambers 5. From these chambers 5 the air compressed, at the downward stroke of pistons 31 against the tension of springs 40, is discharged towards the storage tank for storage therein under pressure, the check valves 26, 32, 33, 34 and 43 preventing the return of fluid to the above mentioned chambers.

It is thus shown that aside from the double function of a suspending and damping action exerted on the supporting wheels, the system under consideration will accomplish the purpose of storing compressed air within a suitable tank in such manner that the air may be used for recharging the pneumatic tubes of the vehicle tires, without the help of service stations, a factor of undeniable advantage for the driver of the vehicle since it enables him to start his journey safely certain that in the case of possible leakages of air from the tires, he will be able to recharge them at once without the complication and loss of time resulting from the use of mechanical inflators requiring excessive physical strain and considerable loss of time for the recharge of the tires.

It is evident that the matter described and disclosed is only an embodiment and one of the many possible ways to carry the present invention into practice, it being hereby clearly established that modifications as to detail are feasible in the assembly constituting the apparatus applicable to the system forming the basical principle of this invention, without departing from the limits and scope of the invention as defined by the appended claims.

Having now particularly ascertained and described the nature and scope of the present invention and in which manner the same is to be carried into practice, it is hereby declared that what is claimed to be of the exclusive property and invention of the applicants, is:

1. An oscillation cushioning device for vehicles of the type in which an air cushion connected to a storage tank for compressed air is disposed between vehicle frame and wheel, and a pump adapted to be operated by the movement between frame and wheel is connected to said tank; said device comprising a casting block supported by the axle of said wheel, said casting block having a central bore and two lateral bores forming a central cylinder and two lateral cylinders, respectively, each of said lateral cylinders comprising a plurality of step cylinders, one above the other and of increasing diameters, a piston associated with each of said steps, a supporting member mounted at said frame, a central and two lateral piston rods secured at their respective top heads at said supporting member, the central piston rod having mounted thereon a piston associated with the central cylinder and the lateral piston rods being connected to the pistons associated with said top steps of said lateral cylinders and adapted for reciprocation relative to the respective cylinders on movement between said wheel and said frame; said central cylinder further having two resilient casings therein one on each side of the piston in said central cylinder, and each secured at one end to the latter and at the other end to an end of said central cylinder, said resilient casings being operative to support the frame relative to the associated wheel and forming pneumatic chambers, means for connecting said pneumatic chambers to said storage tank; the top heads of said lateral cylinders having air intakes connecting the space of said top step with the atmosphere, and check valves for controlling said air intakes, the bottom heads of said lateral cylinders each having a check valve connecting the space of the related bottom step to a pipe line leading to said storage tank, said pistons associated with the steps of said lateral cylinders having passages therethrough, connecting both sides of the respective pistons, check valves associated with said passages and adapted and disposed so as to be opened at the upstroke of said pistons associated with the steps of said lateral cylinders when the pressure above the respective valve associated with said passages exceeds that below the same, said check valves at the lateral cylinder heads being adapted and disposed so as to be opened at the downstrokes of said pistons associated with the steps of said lateral cylinders; thereby, to build up the pressure in said lateral cylinders stepwise between intake of atmospheric air and delivery to said storage tank to generate storable compressed air in said lateral cylinders, while maintaining the pressure in said pneumatic chambers within said central cylinder at a certain pressure level.

2. A device as set forth in claim 1 wherein said air intakes are of tubular form and provided with straining means for preventing the entrance of foreign matter into said lateral cylinders.

3. A device as set forth in claim 1 wherein a cap is provided, rigidly mounted at said supporting member, and adapted to enclose the top head and sides of said casting block so that the latter may reciprocate therein at movement between frame and wheel, said cap comprising double-walled sides, and a cover thereon; the space within said double-walled sides being adapted to contain a lubricating fluid, the inner wall defining said space being perforate so as to allow said lubricating fluid to seep through the perforations thereof and to lubricate the walls of said casting block; said cover having guiding holes for said piston rods and openings for the entrance of atmospheric air, filtering members being provided within said cover for preventing foreign matter mixed with said air from passing through said cover.

4. A device as set forth in claim 1, the lower of said pistons associated with the steps of said lateral cylinders, from the second from the top downwards, having return springs associated therewith, said springs being disposed respectively between each two subsequent pistons in the lateral cylinders and between the lowermost of said pistons in the lateral cylinders and the bottom end of the related one of said lateral cylinders.

5. A device as set forth in claim 1, wherein the confronting faces of said pistons associated with the steps of said lateral cylinders are provided with projections and correspondingly shaped recesses adapted to engage one another when on movement of said pistons in the lateral cylinders, said confronting piston faces approach one another, thereby to avoid lateral displacement of said pistons in the lateral cylinders.

6. A device as set forth in claim 1 wherein confronting faces of said pistons associated with the steps of said lateral cylinders are provided with mutually engaging projections and correspondingly shaped recesses, said projections extending from the underside of the upper of said confronting faces and said recesses being formed within the upper side of the lower of said confronting faces; thereby to avoid lateral displacement of said pistons in the lateral cylinders.

MIGUEL NAVARRO.
ENRIQUE JOAQUIN LLOVET.
AURELIO EDUARDO LLOVET.

REFERENCES CITED

The following references are of record in the file of this patent:

UNITED STATES PATENTS

| Number | Name | Date |
|---|---|---|
| 2,115,072 | Hunt et al. | Apr. 26, 1938 |